March 5, 1963  E. B. LEACH  3,079,750
THRUST APPLYING MECHANISM
Filed Oct. 17, 1960
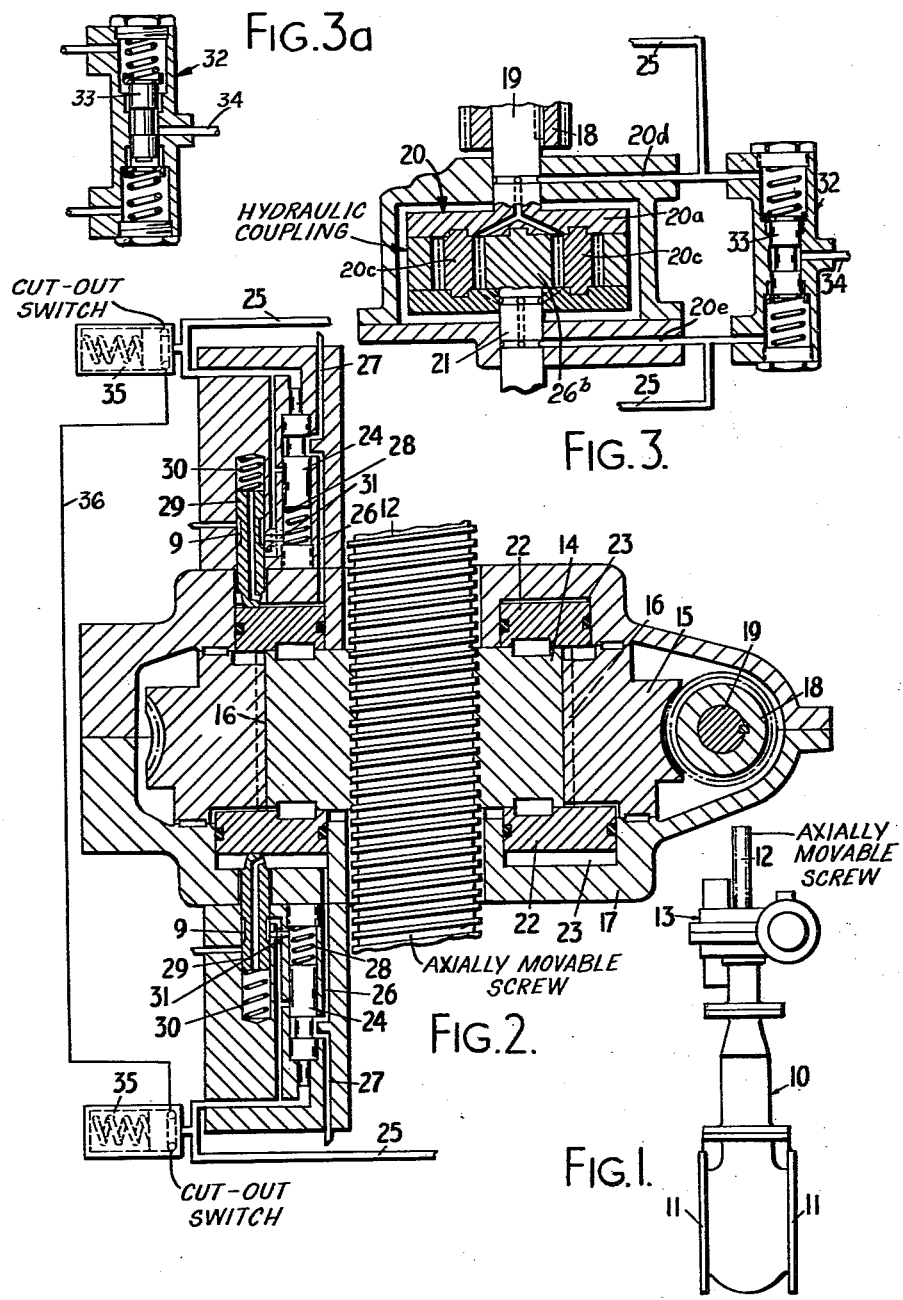
Inventor
E. B. Leach 3,079,750
THRUST APPLYING MECHANISM
Edward Blackwell Leach, Ash Hill, Compton, England, assignor to Audley Engineering Company Limited, Newport, England
Filed Oct. 17, 1960, Ser. No. 63,120
Claims priority, application Great Britain Oct. 27, 1959
4 Claims. (Cl. 60—6)

This invention relates to thrust applying mechanism and is especially concerned with mechanism adapted to apply a thrust to fluid controlling valves of the gate type although it is to be understood that the present invention may also be used in other applications where it is required to apply a thrust.

Thrust applying mechanism in accordance with the invention comprises a screw which is axially movable but which is restrained or adapted to be restrained against rotation, a nut mounted on said screw, and liquid pressure actuated means for rotating said nut, said means being connected or adapted to be connected to a supply of liquid pressure and there being provided also at least one liquid pressure operated device which is adapted to apply an axial thrust to an axial end face of said nut and which is arranged to receive pressurised liquid from said supply when the torque required to rotate the nut exceeds a pre-determined amount, so as to apply an axial thrust to the nut and thereby move also the associated screw in an axial direction.

Preferably the mechanism is provided with two liquid pressure operated devices which are arranged respectively to apply axial thrusts to the two axial end faces of the nut so that the screws and nut can be moved bodily in either axial direction.

The invention will now be described, by way of example, with reference to the accompanying drawings wherein FIGURE 1 shows in side elevation a fluid controlling valve of the gate type fitted with a thrust applying mechanism in accordance with the invention, FIGURE 2 is a fragmentary sectional elevation on a larger scale showing the thrust applying mechanism in greater detail, FIGURE 3 is a fragmentary sectional view showing a hydraulic coupling which is adapted for use with the mechanism shown in FIGURE 2, and FIGURE 3a is a fragmentary sectional view illustrating another position of a valve shown in FIGURE 3.

Referring firstly to FIGURE 1, a gate valve embodying thrust applying mechanism in accordance with the invention is indicated generally by reference numeral 10, the valve having flanges 11 whereby it can be connected in a pipeline and the gate (not shown) being connected to a screw-threaded spindle 12 which is axially movable but non-rotatable. The thrust applying mechanism is indicated generally by reference numeral 13 and is adapted to move the spindle (and associated gate) in upward and downward directions.

Referring now to FIGURE 2 (which shows the mechanism 13 in greater detail) the screw-threaded spindle 12 extends through, and is in screw-threaded engagement with, a rotatable nut 14 which is surrounded by an annular worm wheel 15. The nut 14 and the worm wheel 15 are inter-connected by splines 16 so that the nut can move axially relative to the worm wheel but is rotatable by the worm wheel, the nut and worm wheel being enclosed in a stationary housing 17 which permits limited axial movement of the nut, but prevents axial movement of the worm wheel.

Engaging with the worm wheel is a worm 18 which is mounted on an output shaft 19 of a hydraulic coupling, generally indicated by reference numeral 20. The hydraulic coupling has an input shaft 21 which can be driven by an electric motor or a hand wheel or by other means (not shown), and has the form of a hydraulic pump comprising a rotatable cylindrical casing 20a which is rigid with the output shaft 19, and in which are rotatably mounted a gear wheel 20b rigid with the input shaft 21, and a plurality or additional gear wheels 20c in engagement with the first mentioned gear wheel, the casing being in communication with passages 20d and 20e through which liquid is admissible to, and dischargeable from, the casing in response to the interaction of the gear wheels, depending on the direction of rotation of the input shaft. When the resistance to rotation of the nut 14 is sufficiently low, the interengaging gear wheels 20b and 20c of the hydraulic pump enable a mechanical torque to be imparted by the input shaft 21 to the output shaft 19 through the medium of the rotatable casing 20a. Thus, with high output pressure and zero delivery of the pump, a mechanical torque is imparted to the output shaft, or alternatively when the pumps output pressure is low and the mechanical torque is zero the volume of the pump delivery will be at a maximum. Or the pump may operate between these two extremes so that it delivers some pressurised liquid and at the same time imparts some mechanical torque to the output shaft.

The mechanism is also provided with a pair of hydraulically operated devices in the form of a pair of annular pistons 22 which are disposed adjacent opposite axial end faces of the aforementioned nut 14. Each of said annular pistons 22 is disposed in a chamber 23 which, as hereinafter described, can receive a supply of pressurised liquid from the hydraulic pump previously referred to.

Associated with each of said annular pistons is a valve block containing a pair of valves. One of said valves (referred to for convenience as a control valve 24) is connected to the hydraulic pump by conduit 25, to the adjacent chamber 23 containing one of the annular pistons by a passage 26, and also to a liquid reservoir (not shown) by passage 27. Said control valve 24 is loaded by a spring 28 so that in an initial position said chamber 23 is connected through the valve 24 to the reservoir (not shown), thereby ensuring that no force is exerted by the piston 22 in the chamber. A rise in hydraulic pressure will have the effect of moving one of the control valves 24 to a position for enabling the associated chamber 23 to receive from the associated conduit 25 high pressure liquid which moves the piston 22 in this chamber so that an axial thrust is exerted on one axial end face of the nut 14. The other of the two valves in each valve block is referred to for ease of description as a return valve 29 and is loaded by a spring 30 so that one end of the valve bears against the side of the associated annular piston 22 remote from the nut so that as said piston 22 is displaced the return valve 29 will be similarly displaced. Each of said return valves 29 coacts with the associated control valve 24 so that at a predetermined position in the movement of each return valve high pressure liquid from the associated conduit 25 will be admitted via recess 9 and port 31 to the control valve 24, as shown in the lower part of FIGURE 2, to cause the control valve to be returned to its initial position.

In operation, the output of pressurised liquid from the hydraulic coupling 20 attempts to rotate the aforementioned worm 18 and with it the worm wheel 15 and nut 14 to cause axial displacement of the screw 12. If the gate attached or connected to the screw is free to move then the nut will be freely rotated by the worm wheel and the gate will be displaced. If, however, the gate resists movement then the output pressure of the pump will rise and this will cause operation of one of the two control valves 24 (liquid being admitted thereto by conduit 25) so that high pressure liquid is admitted to one of the two chambers 23 to effect displacement of the associated annular piston 22. Said piston 22 then applies an axial thrust to one end face of the nut 14 so that said nut and screw are bodily displaced in an axial direction without relative rotation. If the gate now becomes sufficiently free then the worm wheel wil be rotated by the worm so as to cause rotation of the nut and effect corresponding axial displacement of the screw. At the same time, the pressure on the control valve 24 will drop, permitting said valve to resume its initial position in which the associated chamber 23 is connected to the reservoir so that the annular piston 22 will be moved by the nut 14 back to its initial position prior to the nut effecting displacement of the screw 12.

On the other hand if the first movement of the annular piston 22 is insufficient to free the gate to a degree which permits the nut 14 to rotate then the aforementioned return valve 29 will follow the movement of the piston 22 and at the end of the stroke of the piston the return valve will admit high pressure liquid to that end of the control valve 24 which will return said control valve to its initial position. This connects the chamber 23 to the reservoir so that the nut 14 can now be displaced axially along the screw whereby the annular piston 22 is moved to its initial position. The sequence of events is then repeated, the building up of hydraulic pressure resulting in operation of the control valve 24 and a further stroke of the annular piston 22 so that the nut and screw are again displaced bodily. These cycles will be repeated until the gate becomes sufficiently free for the nut to rotate or until the gate reaches one of its limiting positions.

The above described operation applies to movement of the screw in one axial direction and movement in the reverse direction is obtained by reversing the direction of rotation of the hydraulic pump 20, the arrangement being such that if the nut 14 does not rotate then high pressure liquid is supplied to the other valve block.

In the construction illustrated, the hydraulic coupling 20 is connected to a valve unit 32 having a spring loaded valve 33 which serves under the pump output pressure to connect a passage 34 (which leads to the reservoir) to the suction side of the pump, the delivery pressure of said pump being connected to one of the two valve blocks as above described in the event of the torque which is required to rotate the nut exceeding a pre-determined value. In FIGURE 3a the valve 33 is shown in one of its extreme positions in which the passage 24 communicates with the suction side of the pump. Safety devices in the form of pressure operated cut-out switches 35 are also provided as shown, so that if the pressure rises to an unduly high value (as for example when the gate reaches either end of its travel), one of said switches will operate to open the energising circuit 36 of, for example, the electric driving motor (not shown), and thereby stop the pump.

Furthermore, instead of using a worm drive as above described, a pinion may be mounted on the output shaft of the pump, said pinion engaging with an annular pinion slidably mounted on the nut.

The thrust applying mechanism as above described is designed to operate a gate valve and in such an application it will be appreciated that the initial force required to move the gate may be considerably larger than the force required once the gate is free or once it has started to move. The mechanism in accordance with the invention enables such an increased force to be applied at the beginning of the movement whereas further movement can be continued through the worm drive or other geared drive as described above.

It is to be understood, however, that mechanism according to the invention may be used in applications other than a gate valve.

Having thus described my invention what I claim as new and desire to secure by Letters Patent is:

1. Thrust applying mechanism comprising in combination an axially movable, but non-rotatable, screw, a rotatable nut mounted on, and in screw-thread engagement with said screw so that rotation of said nut is accompanied by axial movement of said screw, an annular gear wheel surrounding, and having a splined connection with, said nut so that the latter is rotatable by, but capable of axial movement relative to, said annular gear wheel, a complementary gear wheel in engagement with said annular gear wheel, driving means to which said complementary gear wheel is operatively connected, and which includes hydraulic coupling means in the form of a hydraulic pump so that said complementary gear wheel is operable by said driving means for imparting rotation to said annular gear wheel when the torque required to rotate said nut is sufficiently low, at least one liquid pressure-operable device which is situated adjacent one of the end faces of said nut, and means including a pressure-responsive valve for establishing communication between said pump and said liquid pressure-operable device when the torque required to rotate said nut in one direction exceeds a predetermined amount, said liquid pressure-operable device having a movable part through the medium of which the pressure of the liquid supplied by said pump to said device serves to exert an axial thrust on said nut, and thereby imparts axial movement to said screw in one direction.

2. Thrust applying mechanism according to claim 1, and having in combination a second liquid pressure-operable device which is situated adjacent the other end face of said nut, and additional means including a second pressure-responsive valve for establishing communication between said pump and said second liquid pressure-operable device when the torque required to rotate said nut in the opposite direction exceeds a predetermined amount, said second liquid pressure-operable device having a movable part through the medium of which the pressure of the liquid supplied by said pump to said second device serves to exert an axial thrust on said nut, and thereby imparts axial movement to said screw in the opposite direction.

3. Thrust applying mechanism according to claim 2, and having a pair of additional pressure-responsive valves which co-operate with the other pressure-responsive valves for enabling the operation of the liquid pressure-operable devices to be respected when necessary for reducing the torque required to rotate said nut in each direction.

4. Thrust applying mechansim according to claim 1, and having an additional pressure-responsive valve which co-operates with the other pressure-responsive valve for enabling the operation of said liquid pressure-operable device to be repeated when necessary for reducing the torque required to rotate said nut in the said direction.

References Cited in the file of this patent

UNITED STATES PATENTS

| | | |
|---|---|---|
| 2,875,980 | Grace | Mar. 3, 1959 |
| 2,891,380 | Geyer et al. | June 23, 1959 |
| 2,949,742 | Williamson et al. | Aug. 23, 1960 |
| 2,968,144 | Royle et al. | Jan. 17, 1961 |